(12) United States Patent
Itou et al.

(10) Patent No.: US 11,725,720 B2
(45) Date of Patent: Aug. 15, 2023

(54) TRANSMISSION CASE (71) Applicants: JATCO Ltd, Fuji (JP); NISSAN MOTOR CO., LTD., Yokohama (JP)

(72) Inventors: Tsutomu Itou, Fujinomiya (JP); Aya Nakata, Fuji (JP)

(73) Assignees: JATCO LTD, Fuji (JP); NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/428,390

(22) PCT Filed: Nov. 20, 2019

(86) PCT No.: PCT/JP2019/045416
§ 371 (c)(1),
(2) Date: Aug. 4, 2021

(87) PCT Pub. No.: WO2020/174777
PCT Pub. Date: Sep. 3, 2020

(65) Prior Publication Data
US 2022/0136596 A1 May 5, 2022

(30) Foreign Application Priority Data

Feb. 26, 2019 (JP) ................. 2019-032419

(51) Int. Cl.
*F16H 57/02* (2012.01)
(52) U.S. Cl.
CPC .................... *F16H 57/02* (2013.01)
(58) Field of Classification Search
CPC .... F16H 57/02; F16H 63/3416; F16H 57/032; F16H 57/035; F16H 57/02047; B60K 6/40; B60K 6/48; B60K 6/543; B60Y 2400/61; Y02T 10/62; B60T 1/005; Y10T 74/20018

USPC ........................................................ 74/606 R
See application file for complete search history.

(56) References Cited

U.S. PATENT DOCUMENTS

| | | | | |
|---|---|---|---|---|
| 6,164,427 A | * | 12/2000 | Ogawa | .................... B60T 1/005 |
| | | | | 192/219.5 |
| 2011/0005891 A1 | * | 1/2011 | Hongawara | ......... F16H 63/3416 |
| | | | | 192/219.4 |
| 2011/0132121 A1 | * | 6/2011 | Park | .................... F16H 63/3466 |
| | | | | 74/473.15 |

(Continued)

FOREIGN PATENT DOCUMENTS

| | | | | |
|---|---|---|---|---|
| DE | 102018105098 A1 | * | 9/2018 | ............. F16H 57/02 |
| EP | 2 006 532 A1 | * | 12/2008 | ............. F02N 15/00 |

(Continued)

OTHER PUBLICATIONS

Machine Translation of corresponding WO 2020174777 A1, Itou et al., Mar. 9, 2020 (Year: 2020).*

(Continued)

*Primary Examiner* — Vinh Luong
(74) *Attorney, Agent, or Firm* — Foley & Lardner LLP (57) ABSTRACT

In a transmission case, a pattern exerting a water repellent effect is provided around a connection portion for a connection with an electrical component. A water passage is provided on an upper surface of an outer peripheral surface of the transmission case. A drain portion is provided on a downstream side of the water passage. The drain portion is a through hole provided in the transmission case, the through hole connecting with the water passage.

4 Claims, 6 Drawing Sheets

(56) References Cited

U.S. PATENT DOCUMENTS

| | | | | |
|---|---|---|---|---|
| 2012/0145512 A1* | 6/2012 | Kim | ............... | F16H 63/3425 |
| | | | | 192/219.5 |
| 2018/0156333 A1* | 6/2018 | Al-Regib | ............ | F16H 63/3416 |
| 2022/0056992 A1* | 2/2022 | Itou | ............... | F16H 63/3466 |

FOREIGN PATENT DOCUMENTS

| | | | | |
|---|---|---|---|---|
| JP | 2013-147046 A | | 8/2013 | |
| WO | WO 2010103375 A1 * | | 9/2010 | ............... F01M 5/00 |
| WO | WO 2016096421 A2 * | | 6/2016 | ............... H02K 5/10 |
| WO | WO 2016158065 A1 * | | 10/2016 | ............ F16H 57/027 |
| WO | WO 2016203929 A1 * | | 12/2016 | ............... H02K 5/10 |
| WO | WO 2020174777 A1 * | | 9/2020 | ............ F16H 57/02 |
| WO | WO 2021048927 A1 * | | 3/2021 | ............ F16H 57/027 |

OTHER PUBLICATIONS

Define electrical component, Microsoft Bing, Sep. 30, 2022 (Year: 2022).*

Machine translation of WO 2016096421 A2, Wolff et al., Jun. 23, 2016 (Year: 2016).*

Machine translation of DE 102018105098 A1, Heki et al., Sep. 27, 2018 (Year: 2018).*

Machine translation of WO 2021048927 A1, Nonoyama, Mar. 18, 2021 (Year: 2021).*

* cited by examiner

ENLARGED VIEW

FIG. 6C

TRANSMISSION CASE

TECHNICAL FIELD

According to an aspect of the present invention, a transmission case has a configuration in which a pattern exerting a water repellent effect is provided on an outer peripheral surface.

According to the above aspect of the present invention, water on the transmission case can be quickly drained.

BACKGROUND ART

Some electrical components such as a transmission controller are arranged above a transmission case accommodating a transmission mechanism. The electrical components are electrically connected to the transmission mechanism via a connection portion provided on an upper surface of the transmission case (for example, Patent Literature 1).

There are a plurality of ribs on the upper surface of the transmission case, and water (for example, rainwater) may accumulate between the ribs. Since the rainwater contains impurities (for example, salt), if accumulated rainwater is dried, the salt is deposited. When salt deposit occurs around the connection portion of the transmission case, the connection portion is corroded by the salt. As a result, there is a risk of causing defects in the electrical components.

Therefore, it is required to quickly drain water on the transmission case.

PRIOR ART DOCUMENT

Patent Literature

Patent Literature 1: JP 2013-147046A

SUMMARY OF INVENTION

According to an aspect of the present invention, a transmission case has a configuration in which a pattern exerting a water repellent effect is provided on an outer peripheral surface.

According to the above aspect of the present invention, water on the transmission case can be quickly drained.

BRIEF DESCRIPTION OF DRAWINGS

FIG. 3AA is an enlarged view of a portion of the transmission case of FIG. 3A.

DESCRIPTION OF EMBODIMENTS

Hereinafter, a case where a transmission case of the present invention is a transmission case 2 to be used in a belt continuously variable transmission 1 for a vehicle will be described as an example.

Figure 1:
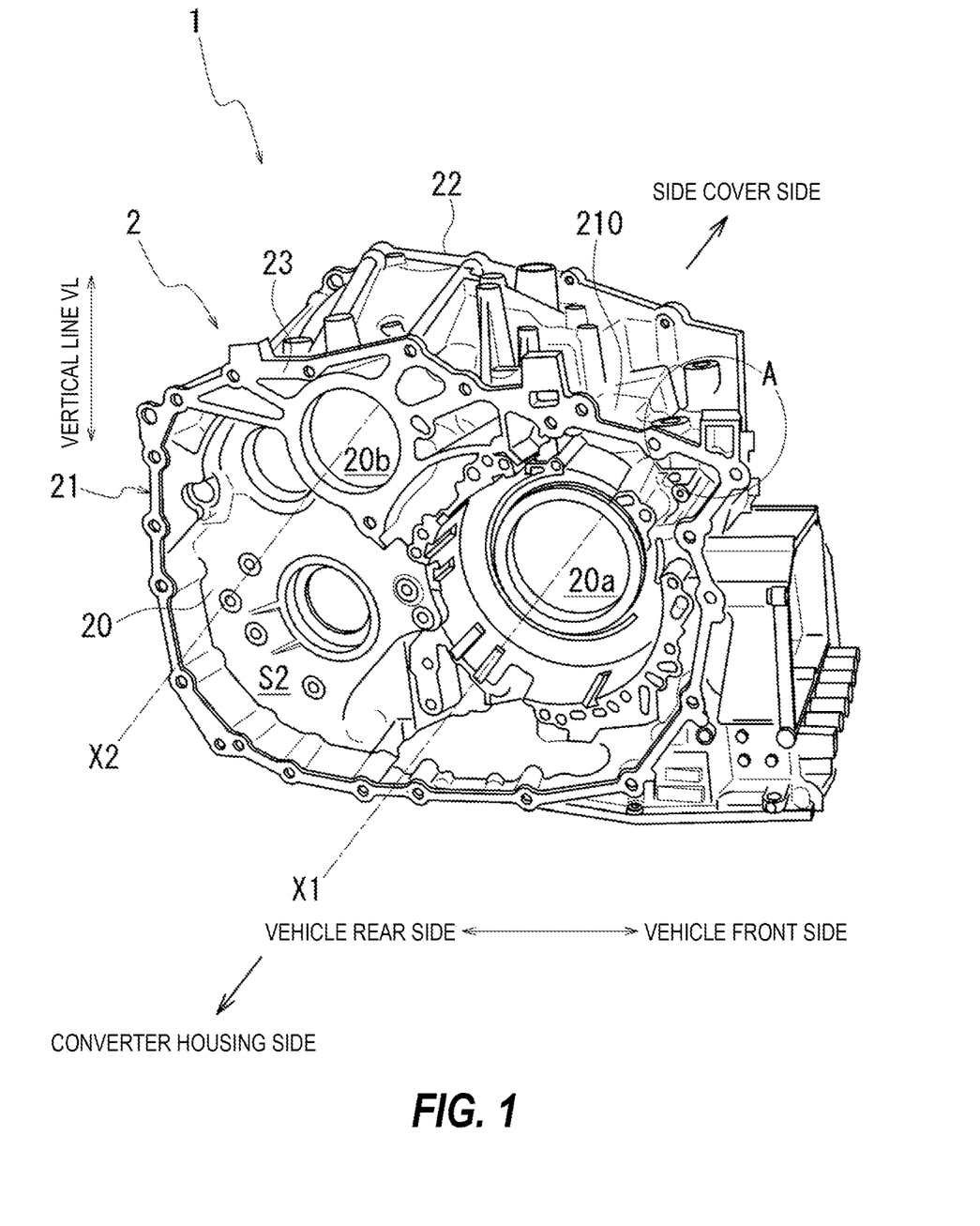
FIG. 1 is a view illustrating a transmission case.

FIG. 1 is a view illustrating the transmission case 2 and is a perspective view of the transmission case 2 as viewed from a converter housing side.

Figure 2:
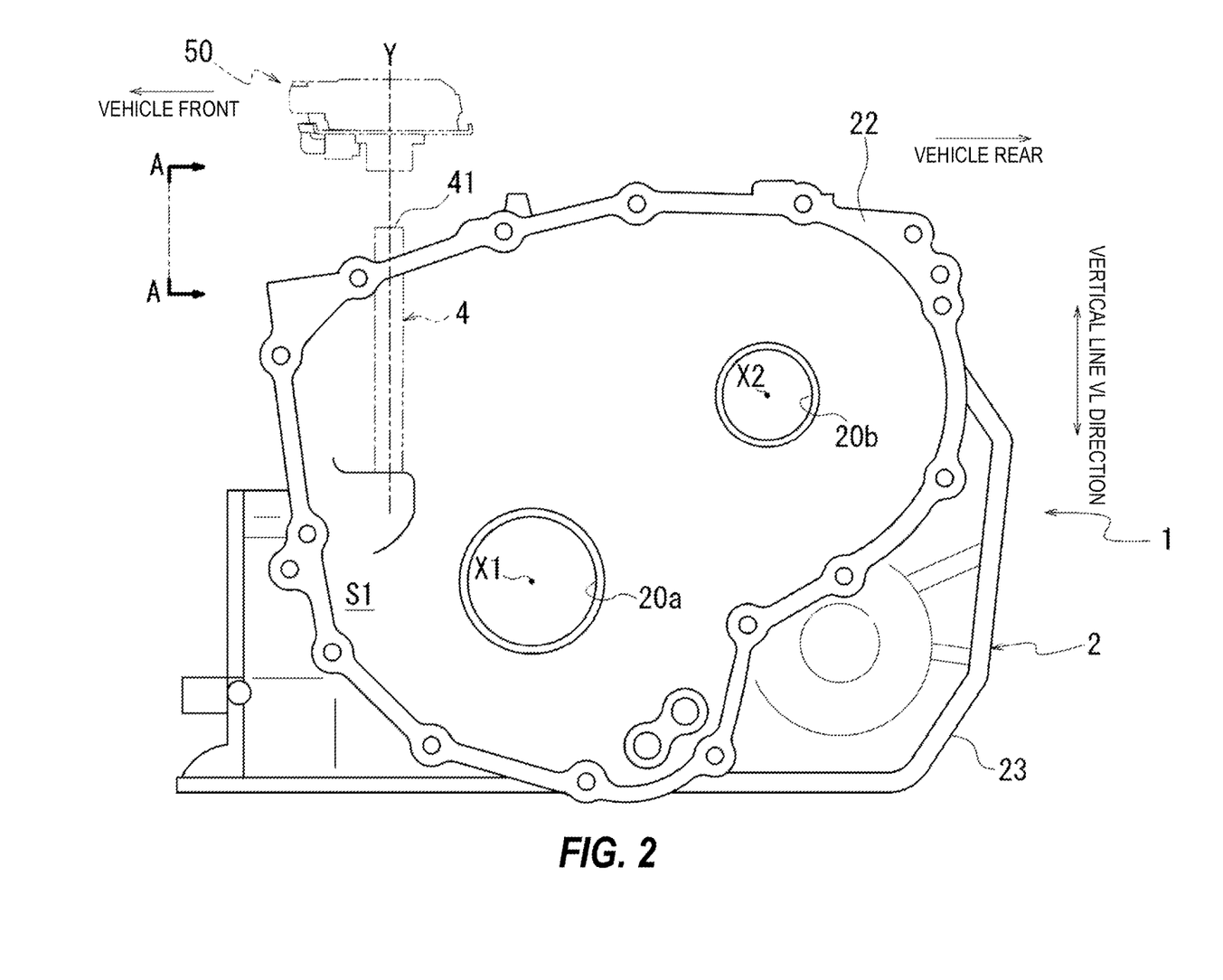
FIG. 2 is a view illustrating the transmission case.

FIG. 2 is a view of the transmission case 2 as viewed from a side cover side. In FIG. 2, an actuator, i.e., electrical component 50 and a manual shaft 4 are illustrated by imaginary lines, and a state in which the actuator 50 is separated from the manual shaft 4 is shown.

As illustrated in FIG. 1, a converter housing (not illustrated) is attached to the transmission case 2 from one side (a near side of a paper surface in FIG. 1), and a side cover (not illustrated) is attached to the transmission case 2 from the other side (a far side of the paper surface in FIG. 1) so as to sandwich the transmission case 2.

The transmission case 2 has an intermediate wall 20 in an internal space. The intermediate wall 20 is orthogonal to a direction in which the converter housing and the side cover overlap each other. The internal space of the transmission case 2 is partitioned by the intermediate wall 20 into a space 51 on the side cover side (the far side of the paper surface in FIG. 1, see FIG. 2) and a space S2 on the converter housing side (the near side of the paper surface in FIG. 1).

The intermediate wall 20 is provided with a peripheral wall portion 21 surrounding a peripheral edge of the intermediate wall 20. The peripheral wall portion 21 is provided to extend across the space 51 on the side cover side and the space S2 on the converter housing side.

A flange portion 23 is formed at an end portion of the peripheral wall portion 21 on the converter housing side. The flange portion 23 is formed over an entire periphery of an outer peripheral surface 210 of the peripheral wall portion 21.

In the continuously variable transmission 1, a forward/reverse switching mechanism (not illustrated) and a final gear (not illustrated) are accommodated in the space S2 on the converter housing side of the transmission case 2.

As illustrated in FIG. 2, a flange portion 22 is formed at an end portion of the peripheral wall portion 21 on the side cover side. The flange portion 22 is formed over the entire periphery of the outer peripheral surface 210 of the peripheral wall portion 21. In the continuously variable transmission 1, a variator (not illustrated) and a parking mechanism (not illustrated) are accommodated in the space 51 on the side cover side of the transmission case 2.

Through holes 20a and 20b are formed in the intermediate wall 20 of the transmission case 2. The space 51 on the side cover side and the space S2 on the converter housing side (see FIG. 1) communicate with each other via these through holes 20a and 20b.

As illustrated in FIG. 2, the manual shaft 4 of the parking mechanism is arranged on a vehicle front side in the space 51 with reference to an installation state of the continuously variable transmission 1. The manual shaft 4 is arranged in a state in which a rotation axis Y of the manual shaft 4 is orthogonal to center lines X1 and X2 of the through holes 20a and 20b.

In this state, one end portion 41 of the manual shaft 4 protrudes from an upper surface (hereinafter, referred to as an upper surface 210a) of the outer peripheral surface 210 of the transmission case 2 in a vertical line VL direction (see FIG. 3B). The actuator 50 to be described later is connected to the one end portion 41 of the manual shaft 4.

Figures 3, 3A:
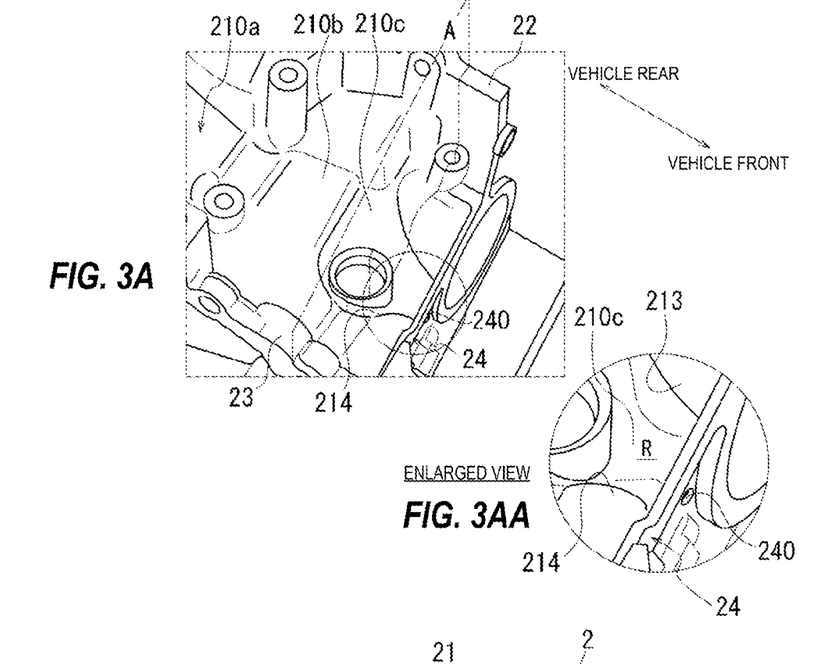
FIGS. 3A and 3B are views illustrating the transmission case.
Figure 3B:
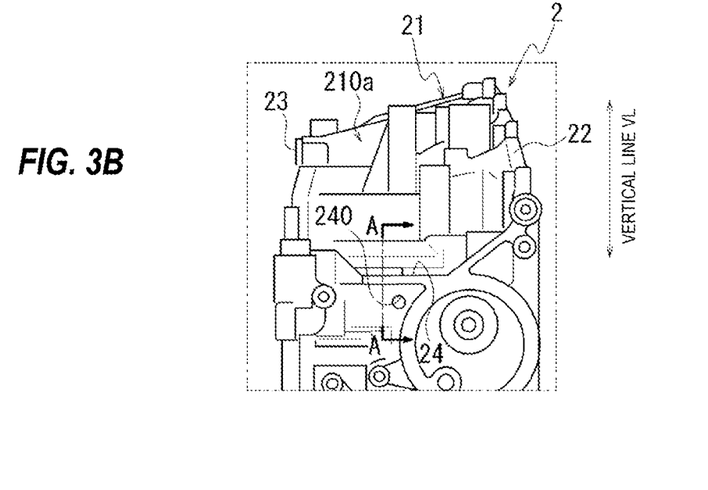

FIGS. 3A and 3B are views illustrating the transmission case 2. FIG. 3A is a view of an A region of the transmission case 2 of FIG. 1 as viewed from above. FIG. 3B is a view of the transmission case 2 of FIG. 2 viewed from an A-A direction. FIG. 3AA is an enlarged view of a portion of the transmission case of FIG. 3A.

Figures 4, 4A:
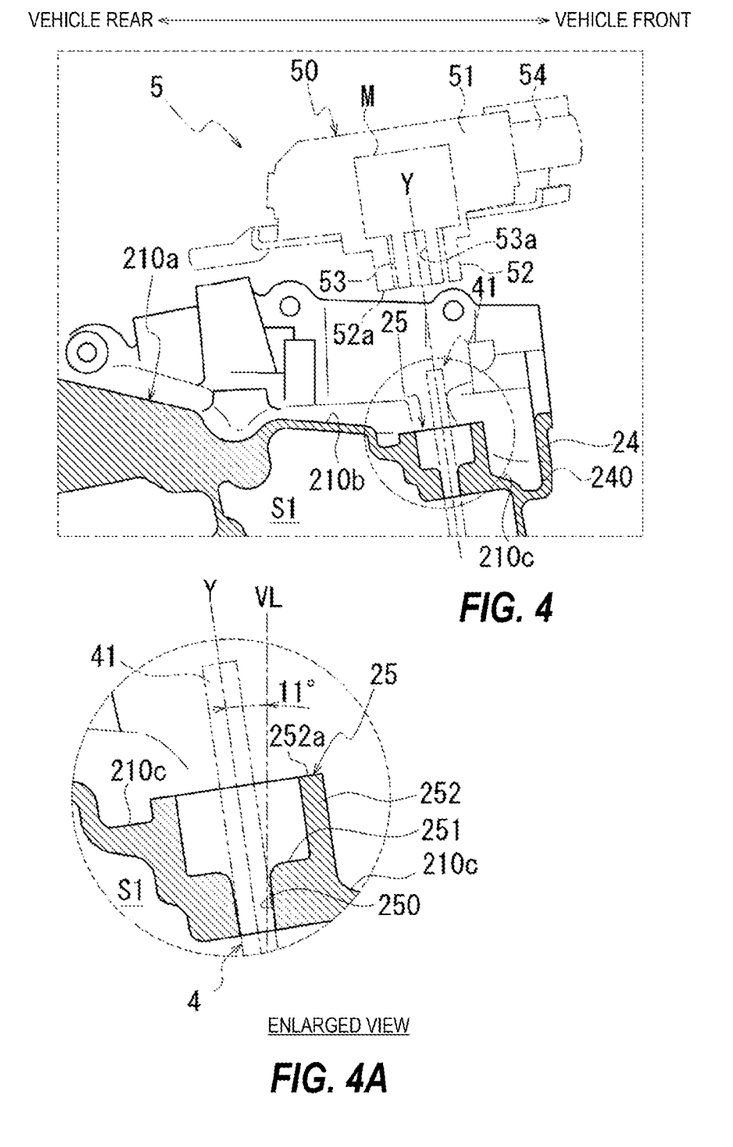
FIG. 4 is a view illustrating the transmission case.
FIG. 4A is an enlarged view of a portion of the transmission case of FIG. 4.

FIG. 4 is a view illustrating the transmission case 2 and is a view schematically illustrating a cross section A-A of FIG. 3B. FIG. 4A is an enlarged view of a portion of the transmission case of FIG. 4. For convenience of explanation, the manual shaft 4 and the actuator 50 are indicated by the imaginary lines, and the actuator 50 is separated from the manual shaft 4.

Figure 5:
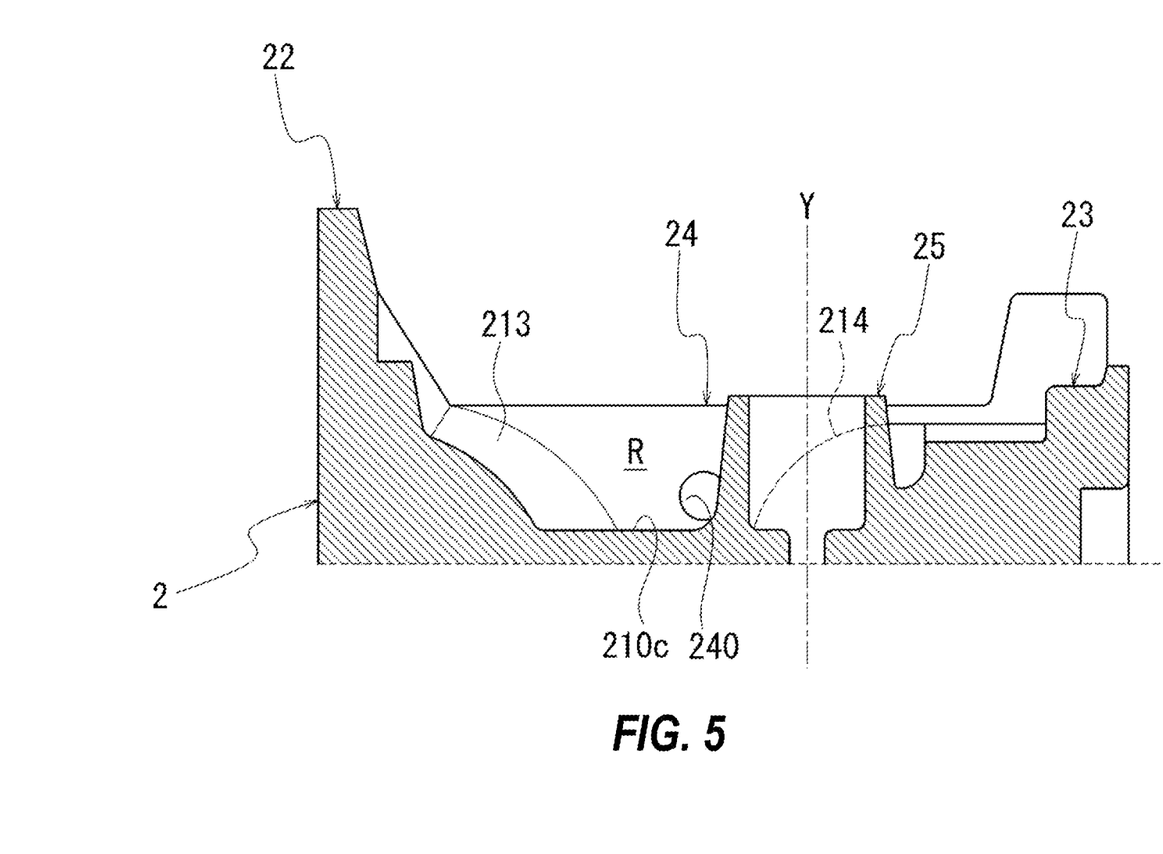
FIG. 5 is a view illustrating the transmission case.

FIG. 5 is a schematic view illustrating the transmission case 2, and is a view of a cross section taken along a surface A of the transmission case 2 in FIG. 3A as viewed from a vehicle rear side.

The continuously variable transmission 1 according to the present embodiment includes a shift-by-wire system 5. In the shift-by-wire system 5, rotation of the manual shaft 4 is performed by the actuator 50.

As illustrated in FIG. 4, in the shift-by-wire system 5, the actuator 50 is connected to the one end portion 41 of the manual shaft 4 protruding from the upper surface 210a of the transmission case 2.

The actuator 50 includes a motor M inside a housing 51. The housing 51 is provided with a cylindrical portion 52 extending from the housing 51. A cylindrical fitting portion 53 extending from the motor M is accommodated in the cylindrical portion 52. An inner periphery 53a of the fitting portion 53 is spline-fitted to the one end portion 41 of the manual shaft 4.

The cylindrical portion 52 is connected to a connection portion 25 of the transmission case 2 to be described later.

The housing 51 of the actuator 50 is provided with a connection terminal 54 to which a wire harness (not illustrated) is connected. The motor M is electrically connected to a shift lever (a shift switch) (not illustrated) via the wire harness connected to the connection terminal 54.

In the shift-by-wire system 5, the actuator 50 rotates the manual shaft 4 around the rotation axis Y according to a range selected by the shift lever (the shift switch) (not illustrated).

With reference to the installation state of the continuously variable transmission 1, the manual shaft 4 is arranged in a state in which the rotation axis Y is inclined by about 11° toward the vehicle rear side with respect to the vertical line VL direction.

As illustrated in FIG. 3A and FIG. 4, with reference to the installation state of the continuously variable transmission 1, the upper surface 210a of the transmission case 2 is formed with a first step portion 210b and a second step portion 210c that are offset downward in stages from the upper surface 210a in the vertical line VL direction toward the vehicle front side. The first step portion 210b is lower than the upper surface 210a. The second step portion 210c is lower than the first step portion 210b. The first step portion 210b and the second step portion 210c each are inclined downward in the vertical line VL direction on the vehicle front side.

As illustrated in FIG. 4 and FIG. 4A, the second step portion 210c is provided with the connection portion 25 connected to the cylindrical portion 52 of the actuator 50. The connection portion 25 has a bottomed cylindrical shape including a bottom wall 251 and a peripheral wall portion 252 surrounding a peripheral edge of the bottom wall 251. A through hole 250 is formed substantially at a center of the bottom wall 251.

The through hole 250 communicates an outside of the transmission case 2 and the space 51 on the side cover side of the transmission case 2. A central axis of the peripheral wall portion 252 and a central axis of the through hole 250 coincide with the rotation axis Y of the manual shaft 4.

The manual shaft 4 penetrates through the through hole 250. The one end portion 41 of the manual shaft 4 protrudes from the second step portion 210c (see the imaginary lines).

In this state, the one end portion 41 of the manual shaft 4 is spline-fitted to the inner periphery 53a of the fitting portion 53 of the actuator 50.

An end surface 52a of the cylindrical portion 52 of the actuator 50 and an end surface 252a of the peripheral wall portion 252 of the connection portion 25 are in contact with each other over an entire circumference in a circumferential direction around the rotation axis Y. In this state, the actuator 50 is arranged so as to cover upper sides of the first step portion 210b and the second step portion 210c.

As illustrated in FIG. 4, the transmission case 2 is provided with a side wall portion 24 on a side (a downstream side) opposite to the first step portion 210b across the connection portion 25 in a vehicle front-rear direction in the second step portion 210c. As illustrated in FIG. 5, the side wall portion 24 connects the flange portion 22 on the side cover side and the flange portion 23 on the converter housing side across the peripheral wall portion 21 in a direction orthogonal to the vehicle front-rear direction.

As illustrated in FIG. 3A and FIG. 5, a bulging wall 213 bulging upward from the second step portion 210c bulges on the side cover side (a left side in the drawing) of the second step portion 210c. A bulging wall 214 bulging upward from the second step portion 210c bulges on the converter housing side (a right side in the drawing) of the second step portion 210c.

The bulging wall 213 is provided to extend across the side wall portion 24 and the flange portion 22 on the side cover side. The bulging wall 214 is provided to extend across the side wall portion 24 and the flange portion 23 on the converter housing side.

The bulging walls 213 and 214 bulge so as to approach each other toward the vehicle front side, and are inclined so that a bulging height that bulges upward from the second step portion 210c decreases as the bulging walls 213 and 214 approach each other.

A through hole 240 is formed in the side wall portion 24 between the bulging walls 213 and 214.

The through hole 240 is located on the most downstream side of a water passage R formed in a valley between the bulging wall 213 and the bulging wall 214 on the second step portion 210c. The through hole 240 communicates the water passage R and the outside of the transmission case 2. The through hole 240 is set to have a hole diameter through which water droplets W to be described later can be drained.

[Water Repellent Effect]

The water repellent effect will be described.

Figure 6A:
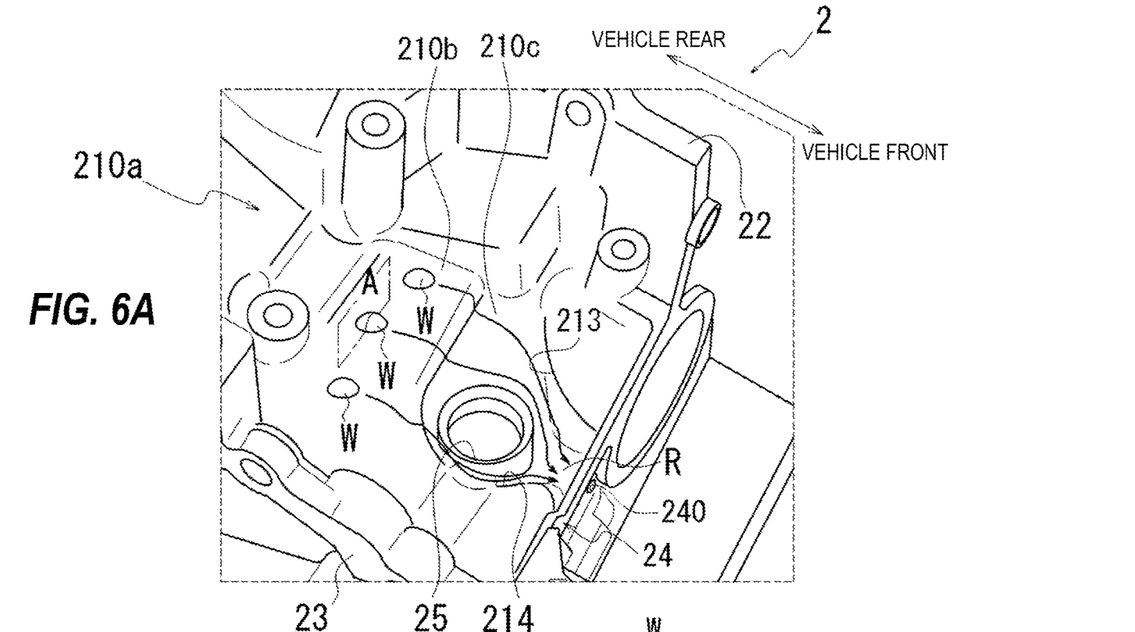
FIG. 6 are views illustrating a water repellent effect.
Figure 6B:
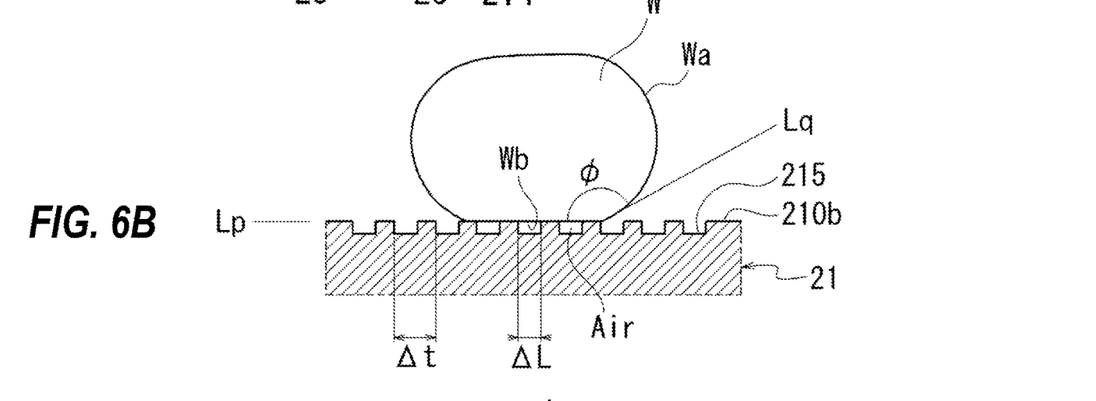
Figure 6C:
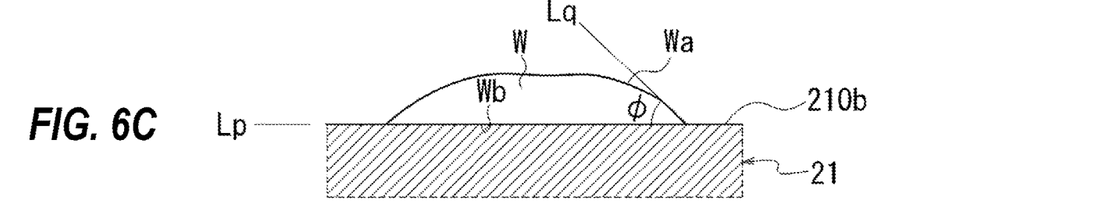

FIGS. 6A-6C are views illustrating the water repellent effect. FIG. 6A is a view illustrating a state in which the water droplets W are attached onto the transmission case 2. FIG. 6B is a view schematically illustrating a cross section taken along the plane A of the transmission case 2. FIG. 6C is a view illustrating a state in which a surface of the transmission case 2 is flat without forming irregularities. Hatching of the water droplets W is omitted for the sake of clarity.

The transmission case 2 is splashed with rainwater flowing along an engine room (not illustrated). The rainwater forms the water droplets W on the transmission case 2 (see FIG. 6A).

In the transmission case 2, a satin-like pattern is provided on the first step portion 210b and the second step portion 210c. Specifically, the satin-like pattern is formed by providing a plurality of concave portions 215 on surfaces of the first step portion 210b and the second step portion 210c. The surfaces of the first step portion 210b and the second step portion 210c have an uneven shape in a cross-sectional view (see FIG. 6B).

A width ΔL of each concave portion 215 is set to, for example, 5 μm to 15 μm. An interval ΔT between adjacent concave portions 215 is set to, for example, 20 μm to 30 μm. Then, the water droplets W do not enter the concave portions 215. A layer of air Air is formed between the concave portions 215 and an interface Wb of the water droplet W. At the interface Wb of the water droplet W, contact with the first step portion 210b or the second step portion 210c and contact with the air Air in each concave portion 215 are alternately repeated (Cassie-Baxter state).

In the Cassie-Baxter state, an angle φ between the interface Wb and a surface Wa of each water droplet W (an angle between a straight line Lp and a straight line Lq; further, referred to as a contact angle φ) is 90 degrees or more (see FIG. 6B). When the contact angle φ is 90 degrees or more, a lotus effect is exerted and wettability of the water droplets W is lowered (water repellency is high).

Therefore, the water droplets W on the first step portion 210b or the second step portion 210c flow so as to roll toward the downstream side due to own weights thereof (see arrows in FIG. 6A). After the water droplets W flow through the water passage R, the water droplets W are drained from the through hole 240 to the outside of the transmission case 2.

Accordingly, it is possible to prevent the transmission case 2 (the connection portion 25) from being corroded by the salt deposited by drying the water droplets W as it is on the transmission case 2.

In the present embodiment, the concave portions 215 are provided on the first step portion 210b and the second step portion 210c, but are not limited thereto. The concave portions 215 may be provided over the entire periphery of the outer peripheral surface 210 of the case 2.

Here, as illustrated in FIG. 6C, when a general flat surface without the concave portions 215 is formed on the first step portion 210b and the second step portion 210c, the interface Wb of the water droplets W does not contact with the air Air but contacts with the first step portion 210b or the second step portion 210c over an entire surface.

Thus, the angle (a contact angle φ) between the interface Wb and the surface Wa is 0 degrees or more and less than 90 degrees. In this case, the lotus effect is not exerted and the wettability of the water droplets W is increased (the water repellency is low).

When the lotus effect is not exerted, the water droplets W are less likely to flow. The water droplets W dry as it is on the first step portion 210b or the second step portion 210c and are in a state where the salt is easily deposited.

The transmission case 2 according to the present embodiment has the following configuration.

(1) A Plurality of Concave Portions 215 (a Pattern Exerting a Water Repellent Effect) are Provided on the Outer Peripheral Surface 210.

With this configuration, the water droplets W are less likely to attach to the outer peripheral surface 210 of the transmission case 2, so that the transmission case 2 can be prevented from being corroded.

The transmission case 2 according to the present embodiment has the following configuration.

(2) The Second Step Portion 210c of the Outer Peripheral Surface 210 is Provided with the Connection Portion 25 for Connection with the Actuator 50 (Outside).

The concave portions 215 are provided locally in the first step portion 210b and the second step portion 210c (around the connection portion 25).

With this configuration, it is possible to further reduce cost as comparing with a case where the concave portions 215 are provided over the entire periphery of the outer peripheral surface 210.

The transmission case 2 according to the present embodiment has the following configuration.

(3) The Water Passage R is Provided on the Second Step Portion 210c.

The through hole 240 (a drain portion) that connects the water passage R and the outside of the transmission case 2 is provided on the downstream side of the water passage R.

With this configuration, the water droplets W around the connection portion 25 flow through the water passage R. The water droplets W are drained through a desired position (the through hole 240). Therefore, it is possible to prevent the water droplets W from flowing to an unintended place on the transmission case 2.

The present invention is not limited to the above embodiments, and various modifications and improvements can be made without departing from the scope of the technical idea thereof. For example, a pattern exerting a water repellent effect may be provided on the outer peripheral surface of the side cover or the outer peripheral surface of the converter housing.

The present application claims a priority of Japanese Patent Application No. 2019-032419 filed with the Japan Patent Office on Feb. 26, 2019, all the contents of which are hereby incorporated by reference.

The invention claimed is:

1. A transmission case, installed in a vehicle, wherein,
   a pattern exerting a water repellent effect is provided around a connection portion connecting with an electrical component, the connection portion being provided on an outer peripheral surface of the transmission case,
   a water passage is provided on an upper surface of the outer peripheral surface of the transmission case,
   a drain portion is provided on a downstream side of the water passage, and
   the drain portion is a through hole provided in the transmission case, the through hole connecting with the water passage.

2. A transmission case, the transmission case being installed in a vehicle, wherein
   the transmission case has a connection portion through which a manual shaft of a transmission penetrates,
   the connection portion has a through hole that penetrates an outer peripheral surface of the transmission case and a peripheral wall portion that surrounds the through hole and protrudes from the outer peripheral surface of the transmission case,
   a pattern exerting a water repellent effect is provided around the peripheral wall portion,
   a water passage is provided on an upper surface of the outer peripheral surface of the transmission case,
   the water passage extends along the peripheral wall portion from an upstream side to a downstream side, and
   a drain portion is provided on the downstream side of the water passage as viewed from the peripheral wall portion.

3. A transmission case, wherein
- a pattern exerting a water repellent effect is provided around a portion where a manual shaft of a transmission penetrates, the portion being provided on an outer peripheral surface of the transmission, wherein
- a water passage is provided on an upper surface of the outer peripheral surface of the transmission case, and
- a drain portion is provided on a downstream side of the water passage, wherein the drain portion is a through hole provided in the transmission case, the through hole connecting with the water passage.

4. A transmission case including a connection portion connecting with an electrical component provided outside the transmission case, wherein,
- the connection portion includes a peripheral wall portion protruding from an outer peripheral surface of the transmission case,
- a pattern exerting a water repellent effect is provided on the outer peripheral surface of the transmission case around the peripheral wall portion,
- in an installation state of the transmission, a water passage is provided on an upper surface of the outer peripheral surface of the transmission case,
- the water passage is arranged to pass by the peripheral wall portion from an upstream side to a downstream side, and
- a drain portion is provided on the downstream side of the water passage, the drain portion being provided in the transmission and connecting with the water passage.

* * * * *